United States Patent [19]

Schamberg et al.

[11] 4,177,221

[45] Dec. 4, 1979

[54] SUBSTRATE-LESS, THERMOSETTING SYNTHETIC RESIN FOIL

[75] Inventors: Eckehard Schamberg, Essen-Kupferdreh; Jürgen Fock, Düsseldorf; Otto Klocker, Essen; Eberhard Esselborn, Gelsenkirchen-Horst, all of Fed. Rep. of Germany

[73] Assignee: Th. Goldschmidt AG, Fed. Rep. of Germany

[21] Appl. No.: 847,753

[22] Filed: Nov. 2, 1977

[30] Foreign Application Priority Data

Nov. 8, 1976 [GB] United Kingdom ............... 46377/76

[51] Int. Cl.² .............................................. C08L 29/14
[52] U.S. Cl. .................................. 525/244; 260/40 R; 525/296; 525/302
[58] Field of Search ................................. 260/850, 862

[56] References Cited

U.S. PATENT DOCUMENTS

| 2,951,772 | 9/1960 | Marzocchi et al. ................... 260/862 |
| 3,997,627 | 12/1976 | Ichimura et al. ...................... 260/862 |

FOREIGN PATENT DOCUMENTS

| 50-75686 | 6/1975 | Japan ...................................... 260/862 |
| 613650 | 12/1948 | United Kingdom ..................... 260/862 |

*Primary Examiner*—Wilbert J. Briggs, Sr.
*Attorney, Agent, or Firm*—James E. Byran

[57] ABSTRACT

This invention relates to a thermosetting, substrate-free, storage-resistant synthetic resin foil which is hard, scratch- and abrasion-proof in the hardened state, comprising: (a) about 60 to 95% by weight of a hardenable polyester resin, (b) about 1 to 15% by weight of a cross-linking agent for the polyester resin, (c) about 5 to 40% by weight of a thermoplastic containing predominantly linear, high-molecular weight reactive groups, (d) about 1 to 15% by weight of a monomer with at least one polymerizable double bond and at least one group reactable with the reactive group of the thermoplastic under the conditions of reaction, (e) and at least one hardening catalyst, and optionally dyestuffs, pigments and/or fillers. The invention also relates to a process for preparing the novel foil of the invention.

6 Claims, No Drawings

SUBSTRATE-LESS, THERMOSETTING SYNTHETIC RESIN FOIL

The invention relates to a substrate-less, thermosetting, long shelf-life synthetic resin foil which in the hardened state is hard and resistant to scratches and abrasion. It is particularly useful in the surface finishing of wood materials, preferably for the veneers of ornamental wood and for decorative layer materials.

It is known to coat the surfaces of wooden plates with low-molecular weight, thermosetting synthetic resins, in particular condensation resins. Such synthetic resins are composed, for instance, of precondensates of phenol-formaldehyde or urea resins or of melamine-formaldehyde resins. While these resins provide thermosetting, very hard and very abrasion-resistant layers, they cannot, on the other hand, be processed to become self-supporting foils which are elastic in the untreated state. Such resins must be deposited as solutions or emulsions or dispersions on substrate webs, particularly paper webs; following drying, they are pressed together with the substrate web onto the surface to be finished.

It is further known to coat substrate webs with synthetic resins which harden by polymerization. Suitable resins, for instance, are prepolymerizates of diallyl phthalate or condensation resins of unsaturated dicarboxylic acids and diols. These resins also provide hard, abrasion-proof surfaces. It is furthermore known to deposit such synthetic resins on a substrate web and to process the two together, the substrate web being removed from the finished surface following processing. However no process is known which permits processing such synthetic resins into self-supporting coating foils which are already non-adhesive and of long shelf-life in the untreated state.

The object of German Offenlegungsschrift No. 1,915,026, is a process for improving the hardness and the scratch-resistance of thermoplastic synthetic materials, comprising thoroughly mixing the thermoplastic synthetic with unsaturated polyesters, adding cross-linking means for the unsaturated polyesters, also with polymerizing catalysts and possibly accelerators, and thereupon cross-linking the unsaturated polyesters in the thermoplastic synthetic, without the polyesters reacting with the thermoplastic synthetic. The proportion of the unsaturated polyester or epoxide resins added to the thermoplastic synthetic should amount to 10 to 50, in particular 20 to 30%, by weight. It is particularly important that the thermoplastic properties be retained and that a reaction between the unsaturated polyester and the thermoplastic synthetic be avoided. The thermoplastic character of the process product is maintained, and its hardness and resistance to scratching are improved.

German Pat. No. 2,212,928, discloses how to make substrate-less, heat-setting coating foils composed of high-molecular weight polymerizates such as (meth)-acrylic acid esters. Hardening in such polymerizate foils takes place by condensing the reactive polymerized groups such as hydroxyl and amide groups and also methoxymethyl amide groups. However, these polymerizate foils in the hardened state possess only a relatively minor density of cross-linking and therefore do not represent thermoplastics. Compared with genuine thermoplastic surfaces, their surface hardness is minor. Therefore, those polymerizate foils are unsuited for many areas of application, for instance for coating working surfaces or plates.

The present invention therefore addresses the problem of creating a self-supporting, thermosetting, long shelf-life synthetic resin foil possessing the outstanding properties of application of the polyester resins and avoiding the above-cited drawbacks. The foils in particular should be non-adhesive in the unhardened state. The products should be highly abrasion-proof and possess good hardness properties when hardened.

Surprisingly, it was found that those and further advantageous properties are combined in a foil composed of (a) 60 to 95% by weight of a hardenable polyester resin, (b) 1 to 15% by weight of a cross-linking agent for the polyester resin, (c) 5 to 40% by weight of a predominantly linear thermoplastic including high-molecular weight, reactive groups, (d) 1 to 15% by weight of a monomer with at least one polymerizable double bond and at least one group reactable with the reactive group of the thermoplastic, (e) and hardening catalysts and possibly dyestuffs, pigments and/or fillers.

The above-cited weight ratios result from the initial requirements. If the contents of hardenable polyester resin are too low, the application properties such as hardness, temperature and solvent resistance will degrade.

Preferably, the proportion of the cross-linking agent for the polyester resin is 5 to 10% by weight.

The monomers cited under (d) and which can react both with the hardenable polyester resin and with the thermoplastics, preferably are present in the foil in an amount between 2 and 5% by weight.

The known hardenable polyester resins of the state of the art are suitable for the foil of the invention. These resins are low-molecular weight conversion products from dicarboxylic acids with at least one reactive double bond in the molecule, for instance maleic acid, fumaric acid, or a phthalic acid with diols such as glycols or bisphenols. The reaction partners may be additionally halogen-substituted and in particular may contain bromine, whereby the flammability-resistance of the polyester resins is improved.

One or several monomers with at least two reactive non-conjugated double bonds in the molecule are used as the cross-linking means for the polyester resin. Examples of such monomers are:

diacrylic esters of divalent alcohols such as ethylene or propylene glycol, dimethacrylic esters of butanediol-1,4, and also divinyl or trivinyl benzene, diallyl phthalate or trimethylol propane trimethacrylate, the allyl-, methallyl or crotyl esters of acrylic or methacrylic acid, maleic, fumaric or itaconic acids and the vinyl esters of allyl acetic acid.

These additives permit cross-linking the synthetic resin and thereby enhance hardening. The required amount of radically cross-linking monomers depends upon the optimal hardening characteristics.

The contents in the foil of the products cited under (c) and (d) in claim 1 are of particular significance. Predominantly linear, high-molecular weight, reactive groups are contained in these thermoplastics. These thermoplastics are essential for the handling properties of the foil and cause them to be self-supporting. The foils being useful in particular for the surface finishing of woods and thus requiring transparency in such cases, a significant selection criterion for the thermoplastics to be used is that they must be compatible with the hardenable polyester resins, particularly following hardening, and must form no optical boundaries or boundary surfaces. A significant characteristic of these thermoplastics is their content of functional groups that may react with other groups under the conditions of hardening. Preferably, these reactive groups are hydroxyl groups or those which release hydroxyl groups in reaction, for instance the esters of alcohols with carboxylic acids of low carbon atom numbers or the low molecular weight ethers of the hydroxy compounds. Further applicable reactive groups are: carboxyl groups or those which release carboxyl groups under the conditions of reaction, or alkoxy-methylamide groups such as the methoxymethyl amide group, or amide groups or epoxide groups. Examples of high-molecular weight, reactive thermoplastics are polyvinyl alcohol, polyvinyl acetate, partially saponified polyvinyl acetate, possibly partially etherified polyvinyl alcohol, polyvinyl acetals such as polyvinyl formal or polyvinyl butyral, and also high-molecular weight esters or acrylic and/or methacrylic acids including the above-cited reactive groups.

The polyfunctional monomers cited under (d) above are of equal significance for the inventive properties of the foil. On the one hand, compounds are involved which contain at least one polymerizable double bond but which additionally contain at least another reactive group capable of reacting under the conditions of hardening with the reactive groups of the thermoplastic. Preferred reactive groups are the amide or alkoxymethylamide groups, in particular the methoxymethylamide group. Particularly suitable monomers are the amide or the N-methoxymethylamide of acrylic or methacrylic acid. These monomers react, on one hand, by means of their polymerizable double bond with the hardenable polyester resin into which they are incorporated during the reaction, and, on the other hand, they react by means of their reactive group with the corresponding group of the thermoplastic. In this manner they create linking between the thermoplastic and the polyester resin. The process products of the invention differ in this respect particularly and essentially in the hardened state from those of German Offenlegungsschrift No. 1,915,026.

As a consequence of this integration of the thermoplastic into the structure of the polyester resin, it is found that the chemical resistance of the hardened polyester resin film is retained and remains non-degraded from the addition of the thermoplastic. Again and surprisingly, the hardness and abrasion resistance of the hardened foil are not degraded. A particular advantage is afforded in that the non-hardened foil can be easily handled and especially is not brittle. The foil furthermore affords a special advantage in practical application by forming a sealed surfaced under pressure and the conditions of hardening on the particular wooden shape to be finished, but nevertheless is no longer squeezed laterally out of the press and flows off.

It is evident that the addition of monomers binding the polyester resin and the thermoplastic takes place within the stated limits in such amounts that the quantity and functionality of the reactive groups are adjusted for each other.

The synthetic resin foil of the invention also may contain up to 5% by weight of an etherified melamine-formaldehyde precondensate. Low molecular weight alcohols such as butanol are used in particular as etherifying alcohols. Shinier surfaces are obtained by means of this addition.

The foil furthermore also contains catalysts for hardening. The selection of the catalysts and the quantity thereof depends upon the optimal hardening under processing conditions, on one hand, and upon the required shelf-life properties of the synthetic resin foil on the other. Such organic peroxides as aryl or arylalkyl peroxides and dialkyl diperalkylates were found to be particularly suitable. Again, small amounts of such acid catalysts as p-toluol sulfonic acid may be added to improve hardening.

The synthetic resin foils may contain commerical UV stabilizers, antistatic agents and/or parting compounds. These are generally added to the solution or the dispersion of the mixture of synthetic resin and polymerizate. The foil also may contain dyestuffs or pigments, and such flame-inhibiting synergists as antimony trioxide.

Foil preparation may be effected in known manner by dissolving the foil ingredients in a solvent such as methylene chloride, methylene ethylketone, tetrahydrofuran, dioxane, acetone, methanol or mixtures thereof, and by pouring the solution so obtained on an abhesive substrate web. The solvent then is evaporated and the synthetic resin foil is removed from the substrate web.

The foil may also be made from a dispersion.

The examples below serve to further elucidate the invention and illustrate processing and testing of the thermosetting or hardened foil.

EXAMPLE 1

(a) Preparing a synthetic resin foil of the invention.

65 parts by weight of a commercial polyester resin are dissolved in a mixture of 150 parts by weight of dichloromethane and 16 parts by weight of methanol. 22 parts by weight of a polyvinyl formal containing about 10% each of acetate and free hydroxyl groups are added to the solution. Thereupon, 9 parts by weight of diallylphthalate and 4 parts by weight of N-methoxymethyl methacrylamide are added, while stirring. Upon obtaining a clear solution of high viscosity, 3 parts by weight of butyl-etherified melamine resin, 0.3 part by weight of a 50% by weight benzoyl peroxide paste, 4.0 parts by weight of a 70% by weight solution of 2,5-dimethylhexane-2,5-diperisononanate, 0.3 part by weight of a commercial parting agent, and 0.3 part by weight of a commercial light-protecting means are added. The solution so obtained is storage-stable for a week and the viscosity thereof does not change during this time.

The solution of the synthetic resin is poured on an abhesive substrate web by means of a casting doctor blade. The density of the deposited layer is 285 gm/m$^2$. After evaporation of the solvent, a non-adhesive foil with a weight of 125 gm/m$^2$ is obtained, which can be removed from the substrate without breaking. The synthetic resin foil exhibits high mechanical strength, is still elastic, and allows storing at 20° C. for at least 6 months without changing.

(b) Processing the synthetic resin foil.

The synthetic resin foil is used for finishing an oak veneer surface. A heated, hydraulic steel-plate press is used. The pressing assembly is composed of the following: heating plate—pressing pad—pressing plate—polyethylene foil, 200 microns—aluminum foil—synthetic resin foil—veneer—film of glue—clamping plate—melamine resin decorative film (white)—pressing plate—pressing pad—heating plate.

The pressing conditions were the following: 145° C., 10 kg/cm²(10 bars), 5 minutes re-cooling of press is omitted.

(c) Testing the chip plate finished with the foil of the invention.

The synthetic-resin finished, veneered chip plate surface is sealed. The coating cannot be differentiated from conventional lacquering by optical means. The surface "feels" attractively like polyester. The Schmiss hardness is 1,200 p (Erichsen test). Abrasion resistance according to Taber (DIN 53,799) is 45 mg/100 revolutions and therefore is higher than the backside melamine resin surface evidencing an abrasion of 70 mg/100 revolutions. Slight hair cracks show up only after a storage of 14 days at 70° C. Again this is a result superior to conventional melamine resin coatings. There is excellent resistance to chemicals in these synthetic resin coatings. Only acetone leaves permanent spots upon exposure of at least 8 hours. Other chemicals such as alcohols, esters, organic acids, mineral oils, gasoline, benzene, carbon tetrachloride and dilute acids and lyes leave no traces upon 16-hour exposure. Water vapor causes neither clouding nor loss of gloss. In the short weather (Xeno-) test, loss of gloss and slight damage to the surface occur only after 600 hours. Correspondingly open-air weathering of several months causes no changes in the surface.

(d) Testing the synthetic resin foil pressed between the aluminum foils.

The above-mentioned synthetic-resin coating foil is conventionally pressed for 5 minutes at 145° C., at a pressure of 10 bars between two aluminum foils. The synthetic resin layer is removed and subjected to a 24-hour Soxhlet extraction. Less than 1% by weight is soluble in methylene chloride, whereas the unpressed foil is completely soluble in methylene chloride.

COMPARATIVE EXAMPLE

A solution of synthetic resin is prepared as described in Example 1. However, no polyvinyl formal is added. All other additions are identical with those described in Example 1. The synthetic resin solution so prepared is poured on an aluminum foil and the solvent is evaporated. The weight of the dried layer is 125 gm/m². It is brittle and fragile even though completely soluble in methylene chloride.

The synthetic resin film so obtained is used together with the aluminum foil to finish the surface of a veneered chip material.

The surface finished with the comparison product is sealed. However, resin has been extruded laterally and is present as hardened resin at the edge of the finished plate. It requires grinding off. The hardness of the finished surface is 1,200 p (Erichsen test) as in the case of the finished surface of example 1c; abrasion is 45 to 50 gm/100 rotations (Taber abrader). All other tests drop out, as described in example 1c.

The solubility of a synthetic-resin film pressed between two aluminum foils for a Soxhlet extraction in methylene chloride of 24 hours is less than 1% by weight.

It will be obvious to those skilled in the art that many modifications may be made within the scope of the present invention without departing from the spirit thereof, and the invention includes all such modifications.

What is claimed is:

1. A thermosetting, substrate-free, storage-resistant synthetic resin foil which is hard, scratch- and abrasion-proof in the hardened state, comprising:
    (a) about 60 to 95% by weight of an unsaturated hardenable polyester resin,
    (b) about 1 to 15% by weight of a cross-linking agent for the polyester resin,
    (c) about 5 to 40% by weight of a polyvinyl acetal,
    (d) about 1 to 15% by weight of the N-methoxy methylamide of acrylic or methacrylic acid,
    (e) and at least one hardening catalyst, and optionally dyestuffs, pigments and/or fillers.

2. A foil as defined in claim 1 which contains 60 to 70% by weight of an unsaturated hardenable polyester resin.

3. A foil as defined in claim 1 which contains 5 to 10% by weight of a cross-linking agent for the polyester resin.

4. A foil as defined by claim 1 containing, in addition, up to 5% by weight of etherified melamine-formaldehyde precondensate.

5. A process for preparing a foil as defined in claim 1 comprising dissolving the ingredients forming the foil in a common solvent or mixture of solvents, pouring the solution onto an abhesive substrate web, evaporating the solvent and removing the synthetic resin foil from the substrate web.

6. A foil as defined in claim 1 which contains 2 to 5% by weight of the N-methoxy methylamide of acrylic or methacrylic acid.

* * * * *